United States Patent
Moratz

(10) Patent No.: US 9,909,621 B2
(45) Date of Patent: Mar. 6, 2018

(54) BEARING WITH INTEGRAL GREASE GROOVE RESERVOIRS

(71) Applicant: Schaeffler Technologies AG & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 51 days.

(21) Appl. No.: 15/051,315

(22) Filed: Feb. 23, 2016

(65) Prior Publication Data

US 2017/0241477 A1 Aug. 24, 2017

(51) Int. Cl.
*F16C 33/66* (2006.01)
*F16C 19/16* (2006.01)

(52) U.S. Cl.
CPC .......... *F16C 33/6614* (2013.01); *F16C 19/16* (2013.01); *F16C 2326/43* (2013.01)

(58) Field of Classification Search
CPC .............. F16C 33/6614; F16C 33/6603; F16C 33/6607; F16C 33/6651
See application file for complete search history.

(56) References Cited

U.S. PATENT DOCUMENTS

| | | | | | |
|---|---|---|---|---|---|
| 2,217,801 | A | * | 10/1940 | Katcher | F16C 33/60 384/475 |
| 2,337,403 | A | * | 12/1943 | Myers | F16C 33/6607 384/473 |
| 3,195,965 | A | * | 7/1965 | Van Dorn | F16C 33/6662 384/475 |
| 5,001,377 | A | * | 3/1991 | Parkinson | F16C 33/6607 310/90 |
| 5,106,209 | A | * | 4/1992 | Atkinson | F16C 33/60 384/462 |
| 5,711,615 | A | * | 1/1998 | Stitz | F16C 27/045 384/471 |
| 5,749,660 | A | * | 5/1998 | Dusserre-Telmon | F16C 19/166 384/475 |

(Continued)

FOREIGN PATENT DOCUMENTS

DE 3307845 9/1984

OTHER PUBLICATIONS www.dynospindles.com, Dynomax, "The Book of Spindles," Spindle Facts, last accessed Feb. 22, 2016.

*Primary Examiner* — Thomas R Hannon
(74) *Attorney, Agent, or Firm* — Simpson & Simpson, PLLC

(57) ABSTRACT

A bearing, including: an axis of rotation; an inner ring including a first radially inner circumferential side; an outer ring arranged radially outward of the inner ring and including a first radially outer circumferential side; a cage radially arranged between the inner and outer rings; and at least one rolling element positioned within the cage. The inner ring includes at least one circumferentially extending groove in the radially inner circumferential side and at least one through-bore connecting the at least one circumferentially extending groove to a space formed between the inner and outer rings; or the outer ring includes at least one circumferentially extending groove in the radially outer circumferential side and at least one through-bore connecting the at least one circumferentially extending groove to a space formed between the inner and outer rings.

15 Claims, 6 Drawing Sheets

(56) References Cited

U.S. PATENT DOCUMENTS

| | | | | |
|---|---|---|---|---|
| 5,803,616 | A * | 9/1998 | Persson | F16C 33/6629 |
| | | | | 384/466 |
| 6,354,744 | B1 * | 3/2002 | Henn | F16C 33/605 |
| | | | | 384/564 |
| 6,869,223 | B2 * | 3/2005 | Azumi | B23Q 1/70 |
| | | | | 384/466 |
| 6,969,235 | B2 | 11/2005 | Feest | |
| 7,311,482 | B2 | 12/2007 | Sugita et al. | |
| 7,665,897 | B2 * | 2/2010 | Alam | F01D 25/164 |
| | | | | 384/474 |
| 8,517,612 | B2 * | 8/2013 | Metzger | F16C 33/58 |
| | | | | 384/475 |
| 8,672,555 | B2 * | 3/2014 | Gardelle | F16C 33/588 |
| | | | | 384/469 |
| 9,194,432 | B2 * | 11/2015 | Ashmore | F16C 33/6614 |
| 9,194,433 | B2 * | 11/2015 | Qiu | F16C 33/6651 |
| 9,453,535 | B2 * | 9/2016 | Krause | F16C 33/664 |
| 2006/0034670 | A1 | 2/2006 | Sugita et al. | |
| 2009/0129714 | A1 * | 5/2009 | Shimomura | F16C 19/26 |
| | | | | 384/475 |
| 2015/0030276 | A1 | 1/2015 | Moratz | |
| 2015/0110427 | A1 * | 4/2015 | Berens | F16C 33/588 |
| | | | | 384/446 |

\* cited by examiner

BEARING WITH INTEGRAL GREASE GROOVE RESERVOIRS

TECHNICAL FIELD

The present disclosure relates broadly to bearings, and, more particularly, bearings having one or more grease reservoirs in one or both of inner and outer rings.

BACKGROUND

Grease life in bearings is a primary limiting factor for bearing service life. For example, bearing of angular contact design or deep groove design require extended grease life for high temperature or environmentally challenging applications. Examples include aircraft starter/generators where grease life is short. One known approach to the problem of grease life is to increase the amount of grease in the bearing. For bearings running at higher speeds there is a limit on amount of grease in the bearing cavity itself generally at 30% of free space or less. U.S. Pre-Grant Publication No. US 2015/0030276 discloses grease reservoirs within a cage for a bearing. However, the cage is a relatively small component, which limits space available for the reservoirs. Another known approach is to increase bearing width. However, available application space and cost considerations limit this approach. Grease re-lubrication is known, but this approach requires access to the bearing and additional equipment and increases the cost associated with operation of the bearing.

SUMMARY

According to aspects illustrated herein, there is provided a bearing, including: an axis of rotation; an inner ring including a first radially inner circumferential side; an outer ring arranged radially outward of the inner ring and including a first radially outer circumferential side; a cage radially arranged between the inner and outer rings; and at least one rolling element positioned within the cage. The inner ring includes at least one circumferentially extending groove in the radially inner circumferential side and at least one through-bore connecting the at least one circumferentially extending groove to a space formed between the inner and outer rings; or the outer ring includes at least one circumferentially extending groove in the radially outer circumferential side and at least one through-bore connecting the at least one circumferentially extending groove to a space formed between the inner and outer rings.

According to aspects illustrated herein, there is provided a bearing, including: an axis of rotation; an inner ring including a first radially inner circumferential side; an outer ring arranged radially outward of the inner ring and including a first radially outer circumferential side; a cage radially arranged between the inner and outer rings; and at least one rolling element positioned within the cage. The inner ring includes first and second circumferentially extending grooves in the radially inner circumferential side, the first and second circumferentially extending grooves separated from each other in an axial direction parallel to the axis of rotation, and at least one first and second through-bores connecting the first and second circumferentially extending grooves, respectively, to a space formed between the inner and outer rings; or the outer ring includes first and second circumferentially extending grooves in the radially outer circumferential side, the first and second circumferentially extending grooves separated from each other in an axial direction parallel to the axis of rotation, and at least one first and second through-bores connecting the first and second circumferentially extending grooves, respectively, to a space formed between the inner and outer rings.

According to aspects illustrated herein, there is provided a bearing, including: an axis of rotation; an inner ring; an outer ring arranged radially outward of the inner ring and including a radially outer circumferential side, first and second circumferentially extending grooves in the radially outer circumferential side separated from each other in an axial direction parallel to the axis of rotation, and at least one first and second through-bore connecting the first and second circumferentially extending grooves, respectively, to a space formed between the inner and outer rings; a cage radially arranged between the inner and outer rings; and at least one rolling element positioned within the cage.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims. By "non-rotatably connected" components, we mean that the two components are connected so that whenever one of the components rotates the other component rotates and vice versa.

Figure 1:
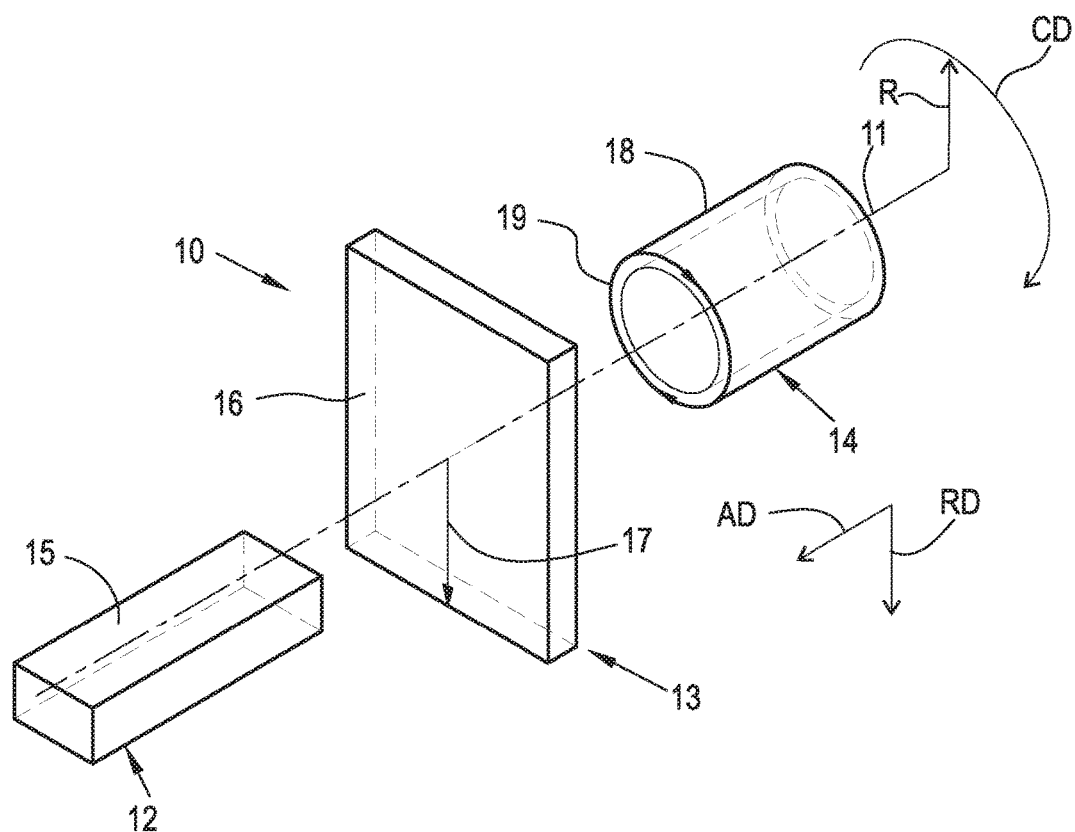
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane parallel to axis 11. Axis 11 is coplanar with planar surface 15; however it is not necessary for an axial surface to be coplanar with axis 11. A radial surface, such as surface 16 of object 13, is formed by a plane orthogonal to axis 11 and coplanar with a radius, for example, radius 17. Surface 18 of object 14 forms a circumferential, or cylindrical, surface. For example, circumference 19 forms a circle on surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively.

Figure 2:
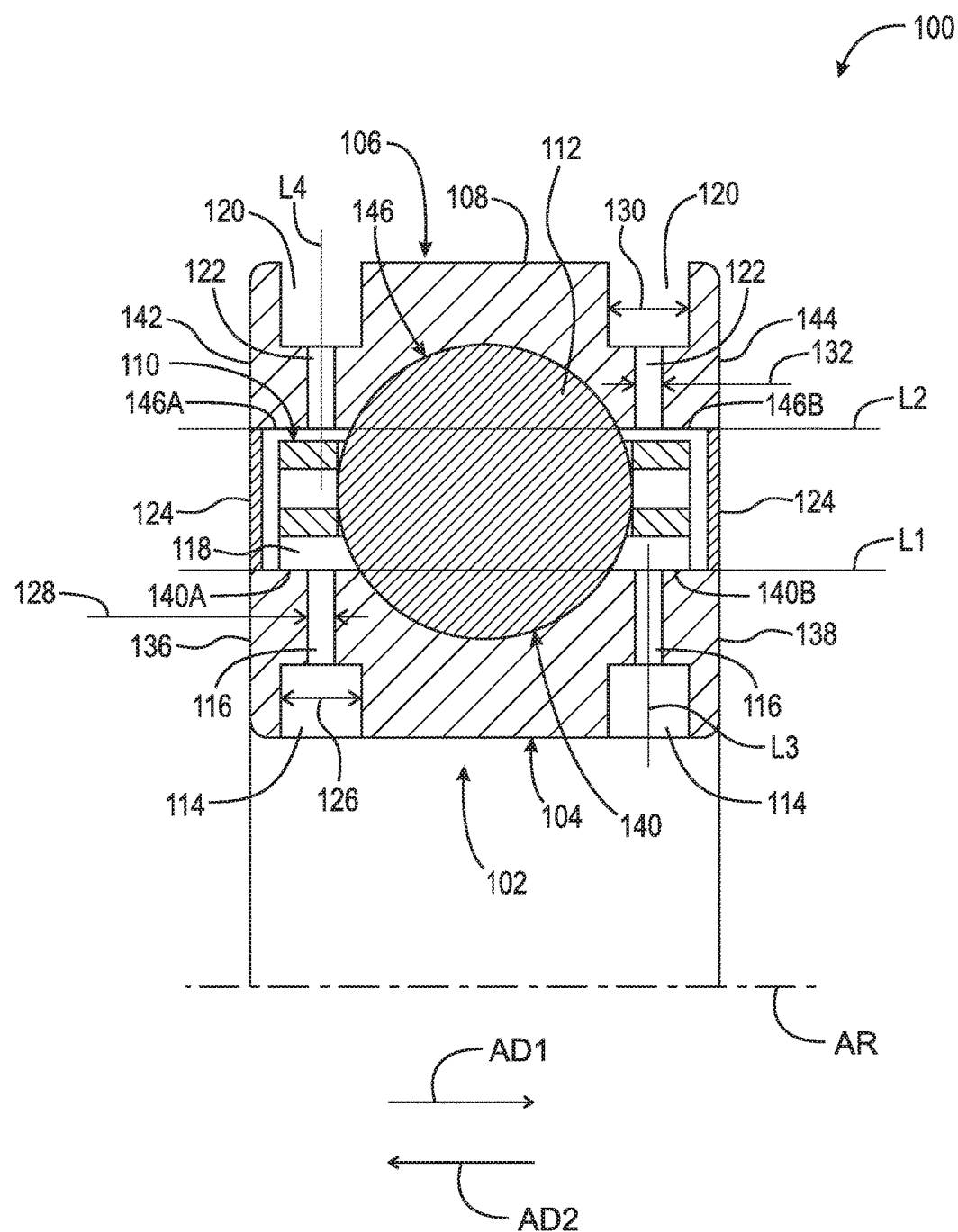
FIG. 2 is a schematic partial cross-sectional view of a bearing having grooves in inner and outer rings for grease retention.

FIG. 2 is a schematic partial cross-sectional view of bearing 100 having grooves in inner and outer rings for grease retention. Bearing 100 includes axis of rotation AR; inner ring 102 including radially inner circumferential side 104; outer ring 106 arranged radially outward of inner ring 102 and including radially outer circumferential side 108; cage 110 radially arranged between rings 102 and 106; and at least one rolling element 112 positioned within cage 110.

In an example embodiment, inner ring 102 includes: at least one circumferentially extending groove 114 in radially inner circumferential side 104; and at least one radial through-bore 116 connecting circumferentially extending groove 114 to space 118 formed between rings 102 and 106. In an example embodiment, outer ring 106 includes: at least one circumferentially extending groove 120 in radially outer circumferential side 108; and at least one radial through-bore 122 connecting circumferentially extending groove 120 to space 118. In an example embodiment, space 118 is sealed in opposite axial directions AD1 and AD2 by seals 124.

In an example embodiment, each groove 114 has extent 126, parallel to axis of rotation AR and each through-bore 116 has extent 128, parallel to axis AR, less than extent 126. In an example embodiment, each groove 120 has extent 130, parallel to axis of rotation AR and each through-bore 122 has extent 132, parallel to axis AR, less than extent 130. In an example embodiment (not shown), extents 130 and 132 are equal.

Figure 3A:
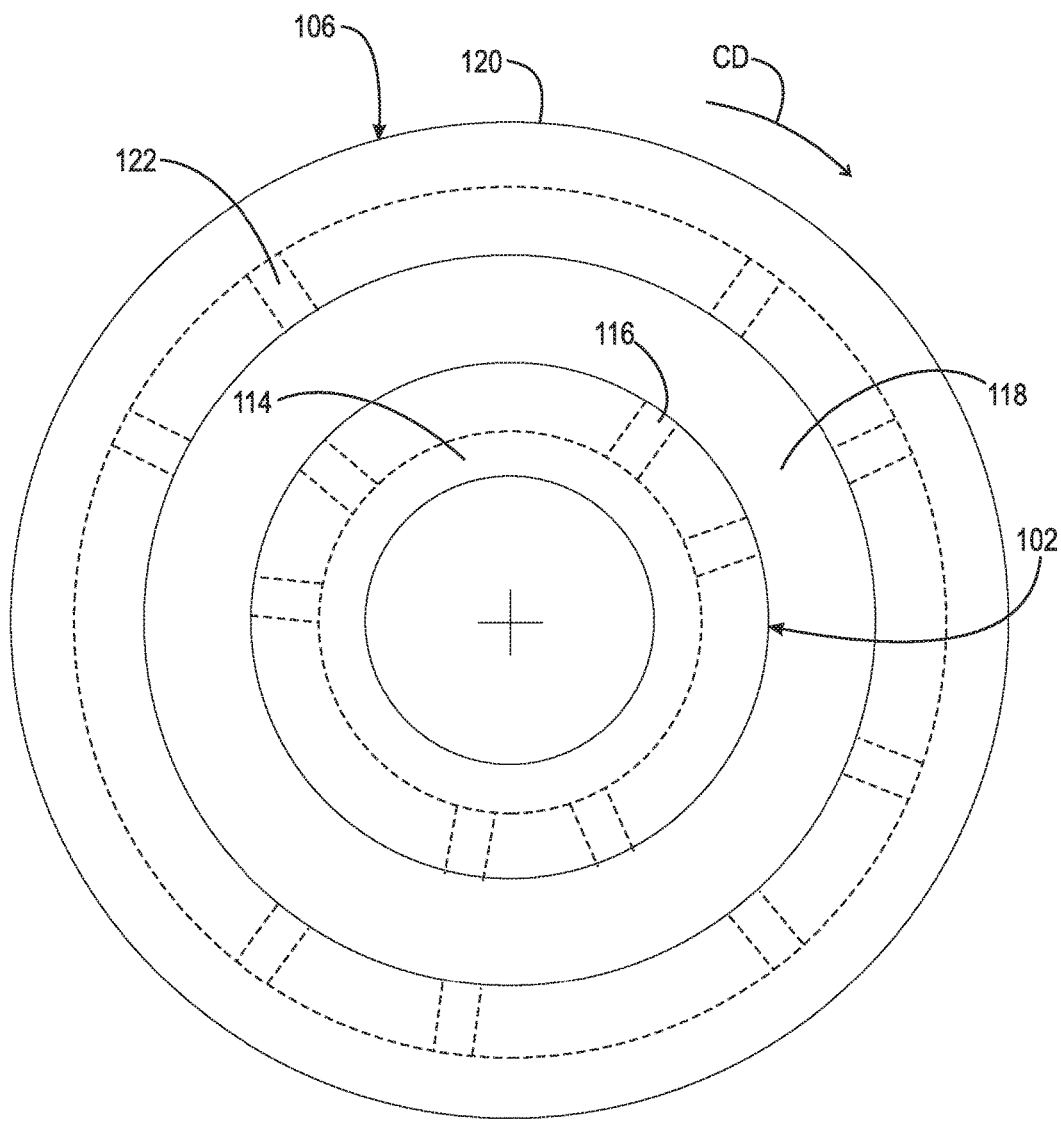
FIG. 3A is a schematic front view of the bearing in FIG. 2 with a continuous groove.

FIG. 3A is a schematic front view of bearing 100 in FIG. 2 with a continuous groove. The following should be viewed in light of FIGS. 2 and 3A. In an example embodiment, for example as shown in FIG. 3A, groove 114 completely encircles inner ring 102 in circumferential direction CD. A particular number of through-bores 116 are shown in FIG. 3A; however it should be understood that other numbers of through-bores 116 are possible for bearing 100. In an example embodiment, for example as shown in FIG. 3A, groove 120 completely encircles outer ring 106 in circumferential direction CD. A particular number of through-bores 122 are shown in FIG. 3A; however it should be understood that other numbers of through-bores 122 are possible for bearing 100.

Figure 3B:
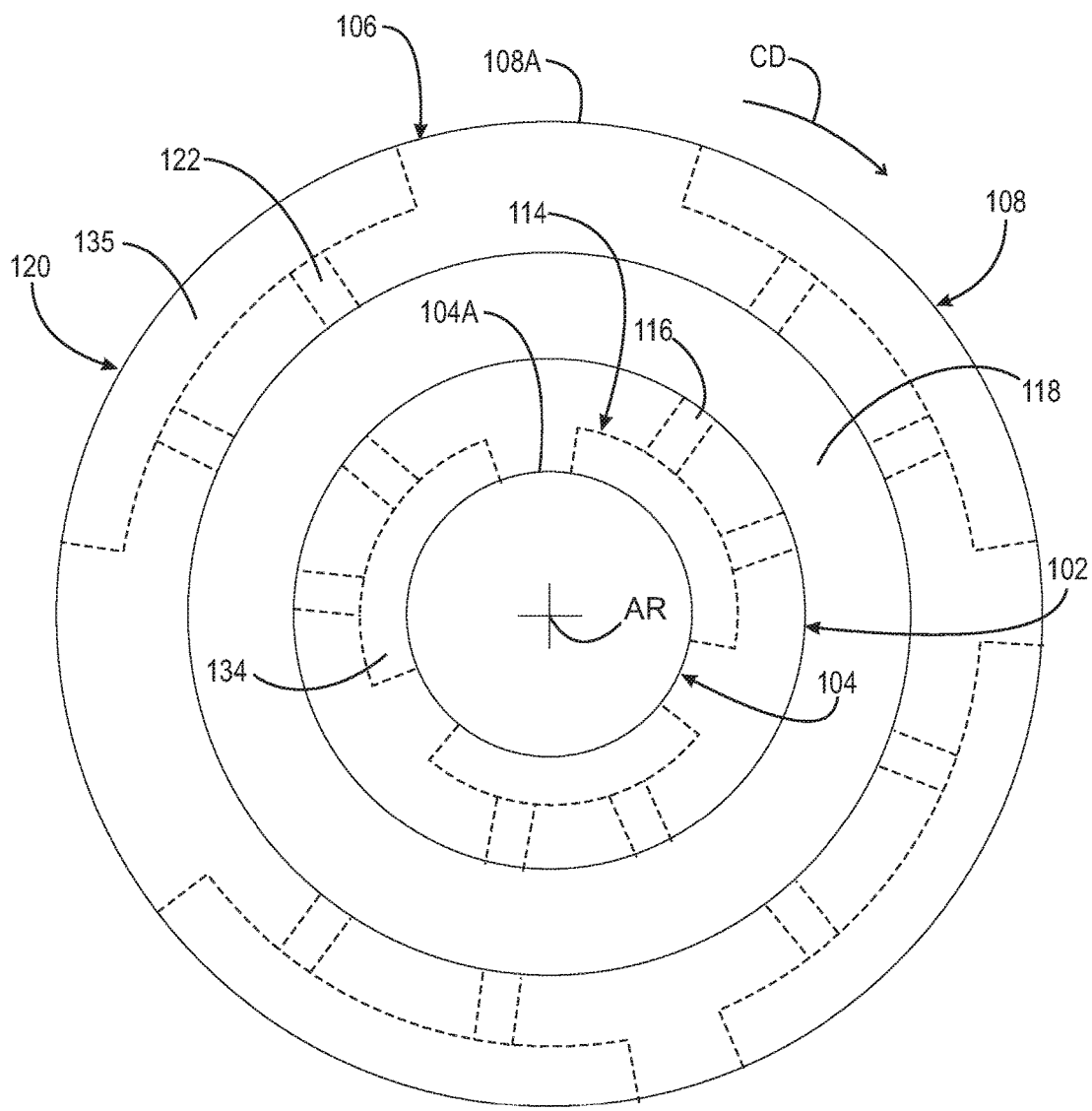
FIG. 3B is a schematic front view of the bearing in FIG. 2 with groove segments.

FIG. 3B is a schematic front view of bearing 100 in FIG. 2 with groove segments. The following should be viewed in light of FIGS. 2 and 3B. In an example embodiment, for example as shown in FIG. 3B, groove 114 includes segments 134 separated from each other, in circumferential direction CD, by portions 104A of side 104. Each segment 134 is connected to space 118 by at least one through-bore 116. It should be understood that other numbers and configurations of segments 134 and through-bores 116 are possible for ring 102. In an example embodiment, for example as shown in FIG. 3B, groove 120 includes segments 135 separated from each other, in circumferential direction CD, by portions 108A of side 108. Each segment 135 is connected to space 118 by at least one through-bore 122. It should be understood that other numbers and configurations of segments 135 and through-bores 122 are possible for ring 106.

In an example embodiment, ring 102 includes two grooves 114 separated from each other in axial directions AD1 and AD2. Each groove 114 includes respective through-bores 116. In an example embodiment, ring 104 includes two grooves 120 separated from each other in axial directions AD1 and AD2. Each groove 120 includes respective through-bores 122.

Inner ring 102 includes axial ends 136 and 138 and radially outer circumferential side 140. Side 140 includes portion 140A directly connected to axial end 136 and portion 140B directly connected to axial end 138. In an example embodiment, line L1 parallel to axis of rotation AR passes through portions 140A and 140B and is co-linear with portions 140A and 140B. Out erring 106 includes axial ends 142 and 144 and radially inner circumferential side 146. Side 146 includes portion 146A directly connected to axial end 142 and portion 146B directly connected to axial end 144. In an example embodiment, line L2 parallel to axis of rotation AR passes through portions 146A and 146B and is co-linear with portions 146A and 146B.

In an example embodiment, each groove 114 is radially aligned with cage 110 so that line L3, orthogonal to axis AR passes through groove 114 and cage 110. In an example embodiment, each groove 120 is radially aligned with cage 110 so that line L4, orthogonal to axis AR passes through groove 120 and cage 110.

Figure 4:
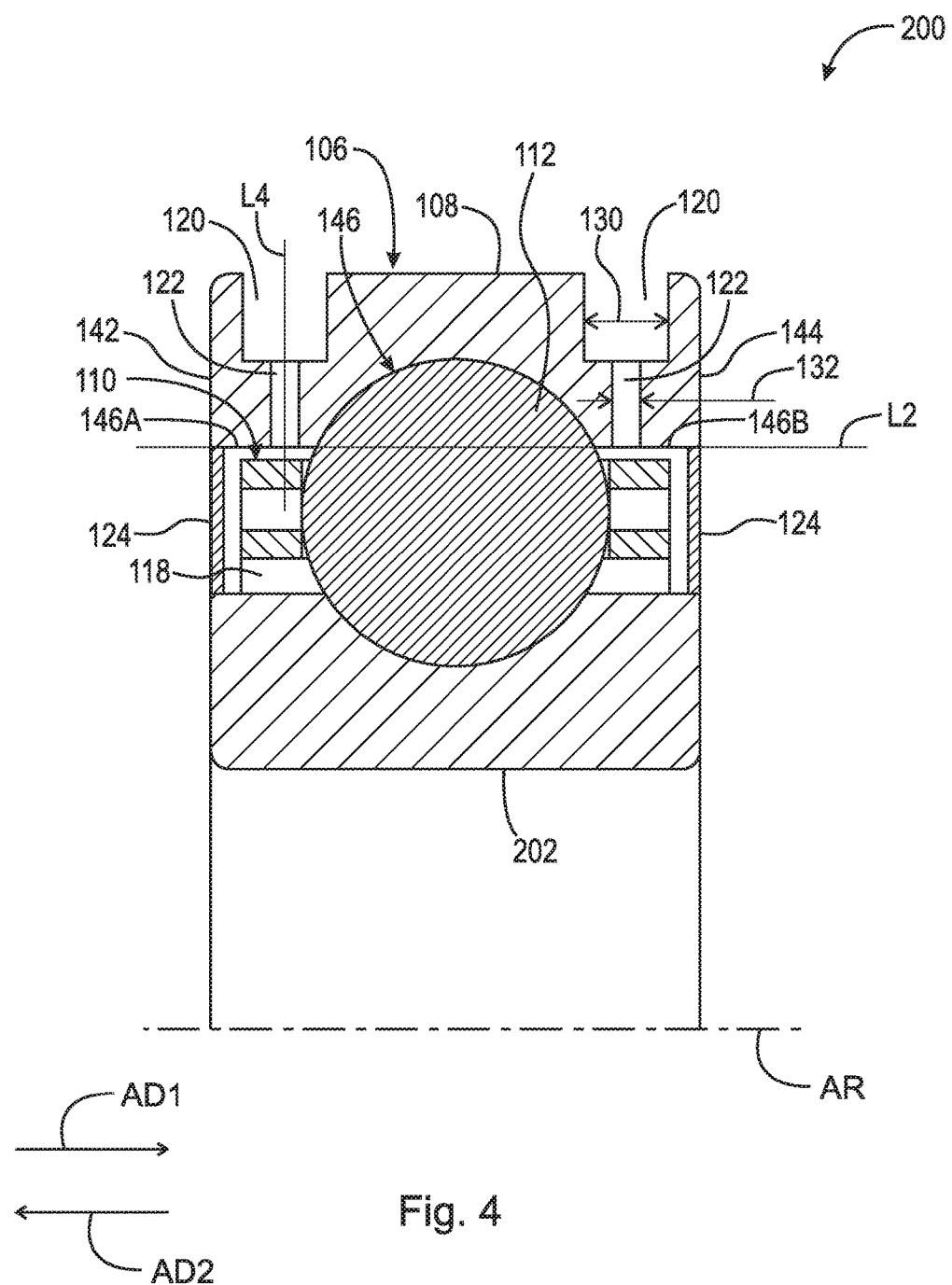
FIG. 4 is a schematic partial cross-sectional view of a bearing having grooves in an outer ring for grease retention; and, FIG. 5 is a schematic partial cross-sectional view of a bearing having at least one groove in an outer ring for grease retention

FIG. 4 is a schematic partial cross-sectional view of bearing 200 having grooves in an outer ring for grease retention. Bearing 200 includes: axis of rotation AR; inner ring 202; outer ring 106; cage 110 radially arranged between rings 202 and 106; and at least one rolling element 112 positioned within cage 110. Outer ring 106 includes: at least one circumferentially extending groove 120 in radially outer circumferential side 108; and at least one through-bore 122 connecting circumferentially extending groove 120 to space 118 between rings 106 and 202. In an example embodiment, each groove 120 has extent 130, parallel to axis of rotation AR and each through-bore 122 has extent 132, parallel to axis AR, less than extent 130. In an example embodiment (not shown), extents 130 and 132 are equal.

FIG. 3A is applicable to bearing 200. In an example embodiment, for example as shown in FIG. 3A, groove 120 completely encircles ring 106 in circumferential direction CD. FIG. 3B is applicable to bearing 200. In an example embodiment, for example as shown in FIG. 3B, groove 120 includes segments 135 separated from each other, in circumferential direction CD, by portions 108A of side 108. Each segment 135 is connected to space 118 by at least one through-bore 122. It should be understood that other numbers and configurations of segments 135 and through-bores 122 are possible for ring 106.

In an example embodiment, ring 106 includes two grooves 120 separated from each other in axial directions AD1 and AD2. Each groove 120 includes respective through-bores 122. Outer ring 106 includes axial ends 142 and 144 and radially inner circumferential side 146. Side 146 includes portion 146A directly connected to axial end 142 and portion 146B directly connected to axial end 144. In an example embodiment, line L2 parallel to axis of rotation AR passes through portions 146A and 146B and is co-linear with portions 146A and 146B. In an example embodiment, each groove 120 is radially aligned with cage 110 so that line L4, orthogonal to axis AR passes through groove 120 and cage 110.

Figure 5:
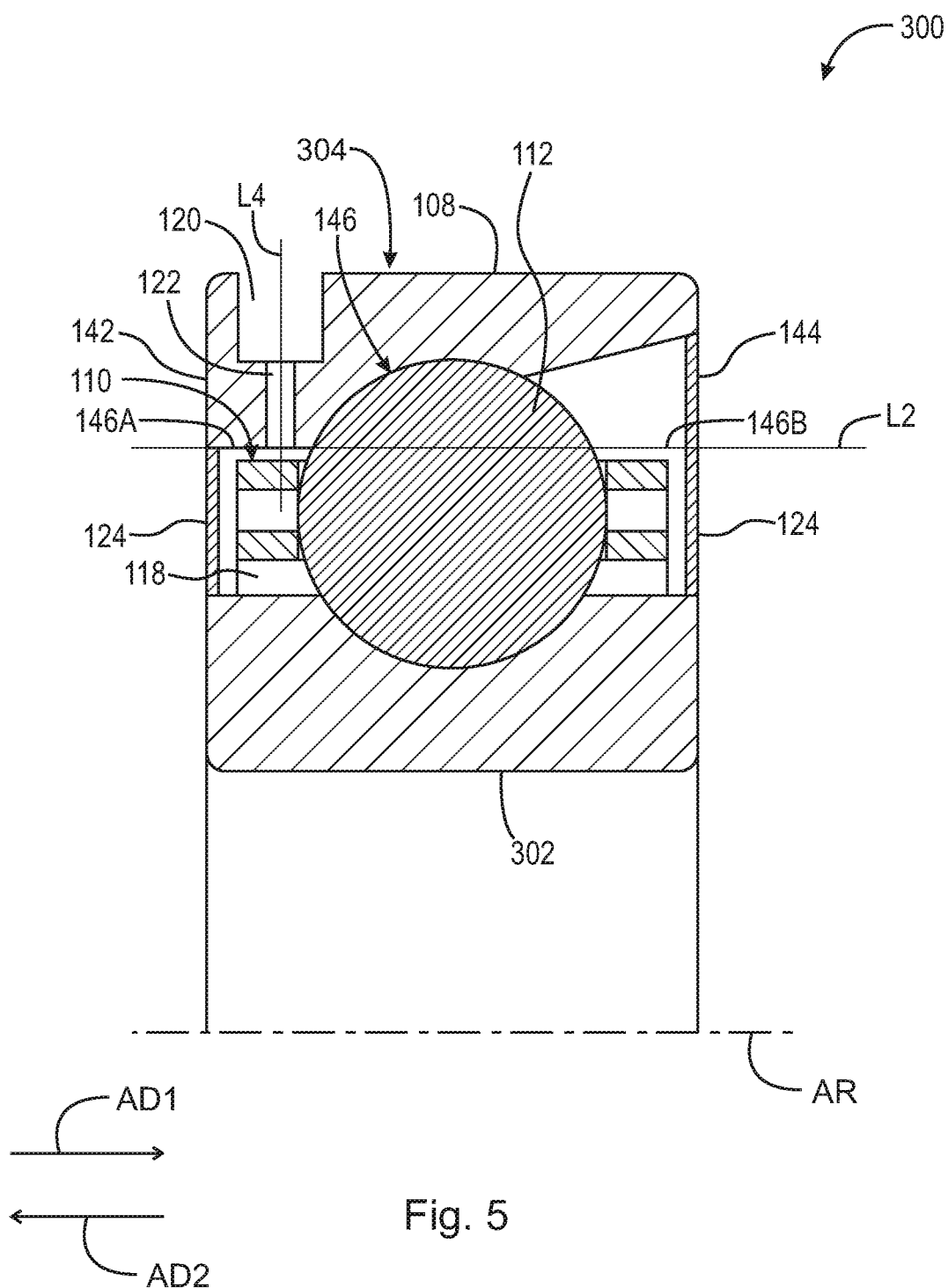

FIG. 5 is a schematic partial cross-sectional view of bearing 300 having at least one groove in an outer ring for grease retention. Bearing 300 includes: axis of rotation AR; inner ring 302; outer ring 304; cage 110 radially arranged between rings 302 and 304; and at least one rolling element 112 positioned within cage 110. Outer ring 304 includes: at least one circumferentially extending groove 120 in radially outer circumferential side 108; and at least one through-bore 122 connecting circumferentially extending groove 120 to space 118 between rings 302 and 304. In an example embodiment, each groove 120 has extent 130, parallel to axis of rotation AR and each through-bore 122 has extent 132, parallel to axis AR, less than extent 130. In an example embodiment (not shown), extents 130 and 132 are equal.

FIG. 3A is applicable to bearing 300. In an example embodiment, for example as shown in FIG. 3A, a single groove 120 completely encircles ring 106 in circumferential direction CD. FIG. 3B is applicable to bearing 300. In an example embodiment, for example as shown in FIG. 3B, groove 120 includes segments 135 separated from each other, in circumferential direction CD, by portions 108A of side 108. Each segment 135 is connected to space 118 by at least one through-bore 122.

In an example embodiment, outer ring 304 includes two grooves 120 separated from each other in axial directions AD1 and AD2 (not shown). Each groove 120 includes respective through-bores 122. Outer ring 304 includes axial ends 142 and 144 and radially inner circumferential side 146. Side 146 includes portion 146A directly connected to axial end 142 and portion 146B directly connected to axial end 144. In an example embodiment, line L2 parallel to axis of rotation AR passes through portions 146A and 146B and is co-linear with portions 146A and 146B. In an example embodiment, each groove 120 is radially aligned with cage 110 so that line L4, orthogonal to axis AR, passes through groove 120 and cage 110.

It should be understood that bearings with grooves 114 and/or 120 are not limited to the configurations shown. Other non-limiting examples include: bearings 200 and 300 with seals, such as seals 124 shown for bearing 100; bearings 100 and 200 with only one groove 120 or only one set of segments 134; and bearing 300 with one or more grooves 114 in ring 302.

Advantageously, bearings 100, 200, and 300 address the problem of grease life noted above without increasing a width of the bearings or requiring the use of re-lubrication systems. For example, the respective inner and outer rings are relatively large components and the available width and circumferential extent of the respective inner and outer rings enable ample volume for circumferential grooves 114 and 120. The ample volume in turn enables storage of large amounts of grease, which results in extended grease life and extended service life for the bearings.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A bearing, comprising:
an axis of rotation;
an inner ring including a first radially inner circumferential side;
an outer ring arranged radially outward of the inner ring and including a first radially outer circumferential side;
a cage radially arranged between the inner and outer rings; and,
at least one rolling element positioned within the cage, wherein
the inner ring includes:
at least one circumferentially extending groove in the radially outer circumferential side;
at least one through-bore connecting the at least one circumferentially extending groove to a space formed between the inner and outer rings;
first and second axial ends; and,
a second radially inner circumferential side, including:
a first portion directly connected to the first axial end; and,
a second portion directly connected to the second end; and,
no line parallel to the axis of rotation passes through both the first and second portions.

2. The bearing of claim 1, wherein:
the at least one circumferentially extending groove has a first extent, parallel to the axis of rotation; and,
the at least one through-bore has a second extent, parallel to the axis, less than the first extent.

3. The bearing of claim 1, wherein:
the at least one circumferentially extending groove completely encircles the outer ring in a circumferential direction.

4. The bearing of claim 1, wherein:
the at least one circumferentially extending groove does not completely encircle the outer ring in a circumferential direction.

5. The bearing of claim 1, wherein:
the at least one circumferentially extending groove includes a plurality of segments;
the at least one through-bore includes a plurality of through-bores;
circumferentially adjacent segments in the plurality of segments are separated, in a circumferential direction, by respective portions of the first radially outer circumferential side; and,
each segment in the plurality of segments is connected to the space by a respective through-bore in the plurality of through-bores.

6. The bearing of claim 1, wherein:
the inner ring includes at least one inner ring circumferentially extending groove in the radially inner circumferential side;
the at least one inner ring circumferentially extending groove includes a plurality of inner ring segments;
at least one inner ring through-bore connects the at least one inner ring circumferentially extending groove to the space formed between the inner and outer rings; and
circumferentially adjacent inner ring segments in the plurality of inner ring segments are separated, in a circumferential direction, by respective portions of the first radially inner circumferential side.

7. The bearing of claim 6, wherein:
the at least one inner ring circumferentially extending groove includes first and second inner ring circumferentially extending grooves separated, in an axial direction parallel to the axis of rotation, from each other.

8. The bearing of claim 1, wherein:
the inner ring includes:
first and second axial ends; and,
a second radially outer circumferential side;
the second radially outer circumferential side includes:
a first portion directly connected to the first axial end; and,
a second portion directly connected to the second axial end; and,
a line parallel to the axis of rotation passes through the first and second portions.

9. The bearing of claim 1, wherein the at least one through-bore is aligned with the cage so that a line orthogonal to the axis of rotation passes through the at least one through-bore and the cage.

10. A bearing, comprising:
an axis of rotation;
an inner ring including a first radially inner circumferential side;
an outer ring arranged radially outward of the inner ring and including a first radially outer circumferential side;
a cage radially arranged between the inner and outer rings; and,
at least one rolling element positioned within the cage, wherein:
the outer ring includes:
at least one circumferentially extending groove in the radially outer circumferential side, the at least one circumferentially extending groove includes a plurality of segments;
at least one through-bore connecting the at least one circumferentially extending groove to a space formed between the inner and outer rings, the at least one through-bore includes a plurality of through-bores;
circumferentially adjacent segments in the plurality of segments are separated, in a circumferential direction, by respective portions of the first radially outer circumferential side; and,
each segment in the plurality of segments is connected to the space by a respective through-bore in the plurality of through-bores.

11. The bearing of claim 10, wherein
the at least one circumferentially extending groove includes first and second circumferentially extending grooves separated, in an axial direction parallel to the axis of rotation, from each other.

12. The bearing of claim 10, wherein the inner ring includes:
at least one first circumferentially extending groove in the first radially inner circumferential side; and,
at least one first through-bore connecting the at least one first circumferentially extending groove to the space formed between the inner and outer rings.

13. The bearing of claim 10, wherein:
the outer ring includes:
first and second axial ends; and,
a second radially inner circumferential side;
the second radially inner circumferential side includes:
a first portion directly connected to the first axial end; and,
a second portion directly connected to the second axial end; and,
a line parallel to the axis of rotation passes through the first and second portions.

14. The bearing of claim 10, wherein:
the first circumferentially extending groove has a first extent, parallel to the axis of rotation; and,
the at least one through-bore has a second extent, parallel to the axis of rotation, less than the first extent.

15. The bearing of claim 10, wherein the first through-bore is aligned with the cage so that a line orthogonal to the axis of rotation passes through the first through-bore and the cage.

* * * * *